United States Patent [19]

Ohta et al.

[11] Patent Number: 5,914,214
[45] Date of Patent: Jun. 22, 1999

[54] METHOD FOR MANUFACTURING AN OPTICAL INFORMATION RECORDING MEDIUM

[75] Inventors: Hiroyuki Ohta; Yoshitaka Sakaue; Eiji Ohno; Noboru Yamada, all of Osaka, Japan

[73] Assignee: Matsushita Electric Industrial Co., Ltd., Osaka, Japan

[21] Appl. No.: 08/982,650

[22] Filed: Dec. 2, 1997

[30] Foreign Application Priority Data

Dec. 6, 1996 [JP] Japan .................................. 8-326386

[51] Int. Cl.$^6$ ................................. G11B 7/24; G11B 7/26
[52] U.S. Cl. ................................ 430/270.13; 430/270.11; 430/945; 369/284; 204/192.26
[58] Field of Search .............................. 430/270.13, 945, 430/270.11; 369/284; 204/192.26

[56] References Cited

U.S. PATENT DOCUMENTS 5,453,346  9/1995  Kawamara et al. ............... 430/270.13

FOREIGN PATENT DOCUMENTS 3-232133  10/1991  Japan .
3-263627  11/1991  Japan .
4-358332  12/1992  Japan .
6-314439  11/1994  Japan .

OTHER PUBLICATIONS

T. Kurumizawa et al., "New Protective Layer for an Optical Disk", *The Japan Society of Applied Physics and Related Society* (extended abstracts), 28p–ZQ–3, p. 839 (English translation) (1988).

*Primary Examiner*—John A. McPherson
*Attorney, Agent, or Firm*—Merchant, Gould, Smith, Edell, Welter & Schmidt, P.A.

[57] ABSTRACT

A method for manufacturing an optical information recording medium having an excellent mechanical strength, thermal stability, and improved overwrite cycle property can be provided by forming the dielectric layer by using a mixed target comprising ZnS and $SiO_2$ in an atmosphere comprising rare gas and at least oxygen at the side where the dielectric layer does not contact to the recording layer. The optical information recording medium is manufactured by using the substrate, the recording layer comprising a material that varies reversibly between the optically identifiable states by an irradiation of a laser beam, and the dielectric layer at least one side of which has a two-layered structure at the upper and lower sides of the recording layer. At least one of the dielectric layers that does not contact to the recording layer is formed by using a mixed target comprising ZnS and $SiO_2$ in a mixed atmosphere comprising rare gas and oxygen.

33 Claims, 3 Drawing Sheets

METHOD FOR MANUFACTURING AN OPTICAL INFORMATION RECORDING MEDIUM

BACKGROUND OF THE INVENTION

The present invention relates to a method for manufacturing an optical information recording medium capable of recording, reproducing and rewriting information at high density and high speed by using an optical system such as a laser beam or the like.

BACKGROUND OF THE INVENTION

The technique of recording and reproducing high density information on an optical disc by using a laser beam or the like is well known and is applied to file of current document, file of still picture, and external memory for computer etc.

Moreover, the rewritable type information recording systems also have been studied, and a phase change optical disc is one of such systems. The phase change disc records signals by using the fact that the recording film generates a reversible optical change between an amorphous state and a crystalline state (or between one crystalline state and a different structured crystalline state) due to an irradiation of a laser beam, and reproduces signals by optically detecting the difference of the optical state as, for example, the difference of the reflectance ratio.

The phase change optical disc has a great merit, that is, an overwrite that records new signals while erasing previously recorded signals can be conducted by passing a laser spot on a signal track only once. In other words, if the power of a laser beam is modulated and irradiated between a recording level and an erasing level in response to signals, in a case where the phase changes between, for example, the amorphous state—crystalline states, a region irradiated at the recording level becomes amorphous because the recording film is cooled after melting regardless of the presence or absence of previously recorded signals, and on the other hand, a region irradiated at the erasing level becomes crystalline because the temperature is increased above the crystallization temperature regardless of the previous state.

The structure of the phase change optical disc is generally a three-layered structure in which a recording layer sandwiched by dielectric layers is provided on a substrate, and a four-layered structure in which a further reflective layer is provided on the above a three-layered structure.

The roles of the dielectric layer are:
1) to enhance the absorption rate of laser beams by the recording layer;
2) to increase the amplitude of the reproduced signals by increasing a change of the reflectance rate between the amorphous state and the crystalline state;
3) to protect the substrate from thermal damage etc.

In the phase change optical disc, since a step of melting the recording film by increasing the temperature above the melting point (for example, 600° C.) is included at the time of recording signals, the dielectric layer is subject to a large thermal stress. Therefore, as a dielectric material which has small internal stress and thermal stability, a mixed material of ZnS and $SiO_2$ (hereinafter, ZnS—$SiO_2$ will be used for an abbreviation) is suggested (Extended Abstracts (the $35^{th}$ Spring Meeting,1988); The Japan Society of Applied Physics and Related Society; 28P—ZQ—3, P839 (1988)). Since this material has a large refractive index, it is suitable for enhancing the absorption rate of laser beams or for increasing the change of reflection rate between the amorphous state and the crystalline state or between crystalline states.

The mixed material of ZnS—$SiO_2$ is confirmed to have a microstructure in which several tens angstrom (several nm) ZnS crystals are dispersed in the amorphous phase of $SiO_2$. In general, the dielectric layer is formed by the sputtering method. Since ZnS formed by the sputtering method has a polycrystal structure, the crystal particle diameter is changed due to heat by repetitive recording, and the recording property is changed or thermal destruction of thin film occurs. However, the crystal growth of ZnS is prevented by dispersing ZnS in $SiO_2$, and thereby the dielectric material becomes stable.

It is also suggested that when ZnS—$SiO_2$ is formed by the sputtering method, if a small amount of $N_2$ gas instead of Ar gas is added, the thermal stability is further enhanced and the overwrite cycle of signals is improved (Publication of Japanese Patent Application (Tokkai Hei) No. 3-232133).

Moreover, it is suggested that when ZnS—$SiO_2$ is formed by the sputtering method, if a small amount of $N_2$ gas and $O_2$ gas is added into Ar gas, or a small amount of $O_2$ gas is added into Ar gas, the same effect can be obtained (Publication of Japanese Patent Application (Tokkai Hei) No. 3-263627).

Since the temperature of the phase change optical disc is increased in accordance with a recording operation, a wide variety of heat resistant protective layers have been investigated. One of such solutions is the ZnS—$SiO_2$ film. The ZnS—$SiO_2$ film has the greatly improved overwrite cycle as compared with the conventional dielectric material that had been thought to be excellent, because it has small internal stress and thermal stability. Moreover, if the ZnS—$SiO_2$ film is formed by the sputtering method in an atmosphere of Ar+$N_2$, the overwrite cycle is improved.

Herein, when ZnS—$SiO_2$ is formed by the sputtering method, if the formation is conducted in an atmosphere where $O_2$ is added into Ar, the overwrite cycle is sometimes improved as compared with an optical disc formed in an atmosphere where $N_2$ is added into Ar. At the same time, however, the thermal stability of the recording signals after the overwrite cycle is found conversely to be lowered.

One possible cause of this is: gaseous $O_2$ present in ZnS—$SiO_2$ film is freed due to the overwrite cycle, disperses in the recording layer and then bonds to the component element of the recording layer, so that the property of the recording layer is changed. In particular, in a case where Ge brings the heat resistance property as in a Ge—Sb—Te system, gaseous $O_2$ present in the ZnS—$SiO_2$ film is bonded to Ge, so that the crystallization temperature is decreased and the amorphous phase becomes unstable. As a result, the CNR (the carrier-to-noise ratio) is presumed to be deteriorated when being subjected to high temperature.

SUMMARY OF THE INVENTION

It is an object of the present invention to avoid the above mentioned conventional problems by providing an optical information recording medium having an excellent overwrite cycle property, thermal stability and high reliability.

In order to avoid the above mentioned problems, the present invention provides a method for manufacturing an optical information recording medium comprising a recording layer that comprises a material that changes reversibly between optically identifiable states by irradiation with a laser beam and a first protective layer comprising a dielectric that is spaced from the recording layer on at least one surface, wherein the method comprising forming the dielectric of the first protective layer by sputtering a target comprising Zn, S and Si in a mixed atmosphere comprising rare gas and at least one gas component having an oxidizing effect, the dielectric of the first protective layer having a variation in the direction of the layer thickness in at least one of the identity or amount of components in the composition.

It is preferable in the above mentioned method that the recording layer is sandwiched by the dielectric layer and the protective layer, and the dielectric layer is any of the dielectric layers whose component materials of the dielectric are the same and the composition of the component material is the same or varies in the direction of the thickness. It is preferable in the above mentioned method that when the composition of the component material varies in the direction of the film thickness, the content ratio of oxygen reduces closer to the recording layer. This is because such a structure prevents oxygen from entering the recording layer.

It also is preferable in the above mentioned method that the dielectric layer is formed by sputtering by the use of a target comprising Zn, S and Si in a mixed atmosphere comprising rare gas and a gas component having at least an oxidation effect.

It is further preferable in the above mentioned method that the protective layer is formed between the recording layer and the substrate.

It is further preferable in the above mentioned method that the recording layer is sandwiched by the protective layers.

It is further preferable in the above mentioned method that the protective layer has a two-layered laminated structure.

It is further preferable in the above mentioned method that the mixed atmosphere varies in the direction of the film thickness of the protective layer or the dielectric layer, and the content of the gas component having an oxidation effect increases further from the recording layer.

It is further preferable in the above mentioned method that a move inhibiting layer that inhibits a component element of the dielectric of said protective layer from moving into the recording layer or the component element of said recording layer from moving into the dielectric is provided at the interface between the protective layer and the recording layer.

It is further preferable in the above mentioned method that the material of the move inhibiting layer is at least one nitride or nitride-oxide of Ge, Si or component elements of the recording layer.

It is further preferable in the above mentioned method that a reflective layer is further provided on the surface of the recording layer opposite to the dielectric layer where laser beams are incident.

It is further preferable in the above mentioned method that the thickness of the reflective layer is not less than 30 nm.

It is further preferable in the above mentioned method that the thickness of the dielectric layer between the recording layer and the reflective layer is in the range of 0 to 30 nm. The above range of thickness permits keeping the phase change of the recording layer without affecting the recording film even if oxygen enters the recording layer.

It is further preferable in the above mentioned method that the thickness of the dielectric layer between the substrate and the recording layer is not less than 30 nm. The upper limit is not limited, but since the dielectric layer may form the substrate, the thickness is limited to the thickness of the substrate (usually not more than 1.2 mm).

It is further preferable in the above mentioned method that the recording layer comprises at least Ge, Sb and Te as the component elements.

It is further preferable in the above mentioned method that the gas component having an oxidation effect in the mixed atmosphere is oxygen.

It is further preferable in the above mentioned method that the oxygen concentration in the mixed atmosphere is not less than 0.1 vol. % and not more than 10 vol. %.

It is further preferable in the above mentioned method that a nitrogen component is further contained in the mixed atmosphere at the concentration not less than 0.1 vol. % and not more than 10 vol. %.

It is further preferable in the above mentioned method that the mixed atmosphere is a mixed gas comprising rare gas and air.

It is further preferable in the above mentioned method that the gas component having an oxidation effect in the mixed atmosphere is nitrous oxide.

It is further preferable in the above mentioned method that the concentration of nitrous oxide in the mixed atmosphere is not less than 1 vol. % and not more than 10 vol. %.

The present method for manufacturing the optical information recording medium comprising a recording layer that comprises a material that changes reversibly between optically identifiable states by irradiation with a laser beam and a first protective layer comprising a dielectric that is spaced from the recording layer on at least one surface, and the method comprising forming the dielectric of the first protective layer by sputtering a rarget comprising Zn, S and Si in a mixed atmosphere comprising rare gas and at least one gas component having an oxidizing effect, the dielectric of the first protective layer having a variation in the direction of the layer thickness in at least one of the identity or amount of components in the composition. Therefore, the optical information recording medium having an excellent overwrite cycle property for a phase change type optical information recording medium and thermally stable reliability can be provided.

Of the protective layers, the dielectric separated from the recording layer is formed by sputtering in a mixed atmosphere comprising rare gas and an oxygen component. Consequently, the Oxygen content of the dielectric can be controlled and the movement of oxygen, freed from the dielectric due to the overwrite cycle, to the recording layer can be inhibited, the heat resistance property of the recording layer at the time of overwrite cycle can be improved, and the lifetime of the recording layer can be improved. In particular, in a case where the recording layer comprises Ge and the Ge compensates the heat resistance property of the recording layer, an oxidation of Ge caused by a movement of oxygen to the recording layer can be inhibited, the heat resistance property of the recording layer can be maintained, and the overwrite cycle is improved.

It is preferable that the recording layer is sandwiched by the above mentioned protective layers, since the above mentioned effect can surely be exhibited.

Moreover, it is preferable that the recording layer is sandwiched by the dielectric layer and the protective layer, and the dielectric layer is any of the dielectric layers whose component material of the dielectric is the same and the composition of the component material is the same or varies in the direction of the film thickness, since the manufacturing process is reduced. In particular, the structure is desired to have a protective layer at the side of the substrate where the temperature is increased at the time of the overwrite cycle.

It is preferable that the protective layer dielectric separated from the recording layer or the dielectric layer in which the mixed atmosphere varies in the direction of the film thickness, and the content of oxygen component increases with increasing distance from the recording layer, since the dielectric material have the continuous structure without showing a layered structure.

Moreover, by an embodiment wherein the move inhibiting layer that inhibits any of the component element of the dielectric of the protective layer or the component element of the recording layer from moving into the recording layer or the dielectric is provided at the interface between the protective layer and the recording layer, not only oxygen of the protective layer but also the component elements of any one of the dielectric of the protective layer and the recording layer can be inhibited from moving. Consequently, the overwrite cycle property particularly can be improved.

Moreover, at least one nitride or nitride-oxide of Ge, Si or component elements of the recording layer is applied as the material for the move inhibiting layer, since as compared with the other move inhibiting layer, the component element may become the barrier of dispersion, and oxygen freed from the dielectric of the protective layer is trapped, as well as the movement of the component element of the dielectric and/or the recording layer can be remarkably inhibited. In particular, it is preferable that nitride or nitride-oxide of Ge or Si is used, since the film quality has high density and the heat resistance property.

Moreover, in a structure where the reflective layer is provided on the surface opposite to the substrate of the protective layer, and the thickness between the reflective layer and the recording layer is thinner than that between the recording layer and the substrate, it is preferable that thermal conductivity between the reflective layer and the recording layer is enhanced and the thermal stress generated through the overwrite cycle is inhibited.

By the above mentioned structure in which at least the dielectric separated from the recording layer or the dielectric layer is formed by sputtering the mixture comprising ZnS and $SiO_2$ in a mixed atmosphere comprising rare gas and oxygen, the mechanical strength becomes excellent. The overwrite cycle property is improved, and furthermore the dielectric is directly separated from the recording layer, so that if exposed to the high temperature for a long time, the dispersion of oxygen into the recording film can be inhibited and the reproducing signal light is not deteriorated. As a result, the optical information recording medium having, in particular, the excellent overwrite cycle property for the phase change type optical information recording medium, excellent heat resistance property and high reliability, can be provided.

The present invention provides an optical information recording medium comprising: a substrate; a recording layer of a material that changes reversibly between optically identifiable states by irradiation with a laser beam; and a first protective layer comprising a dielectric spaced from the recording layer, the dielectric of the first protective layer being formed from Zn, S, Si and a component having an oxidizing effect, wherein the dielectric of the first protective layer has a variation in the direction of the layer thickness in at least one of the identity or amount of component in the dielectric.

It is preferable in the above mentioned optical information recording medium that the component having an oxidizing effect is oxygen.

It is preferable in the above mentioned optical information recording medium that the component having an oxidizing effect is nitrous oxide.

It is preferable that the above mentioned optical information recording medium further comprises a reflective layer on a side of the recording layer opposite a side where laser beams are incident in use with respect to the recording layer.

It is preferable that the above mentioned optical information recording medium further comprises a dielectric layer between the recording layer and the dielectric layer.

It is preferable in the above mentioned optical information recording medium that wherein the thickness of the dielectric layer between the recording layer and the reflective layer is in the range of 0 to 30 nm.

It is preferable in the above mentioned optical information recording medium that the recording layer comprises Ge, Sb and Te.

It is preferable in the above mentioned optical information recording medium that a dielectric layer is present between the recording layer and the substrate.

It is preferable in the above mentioned optical information recording medium that the dielectric layer between the recording layer and the substrate has a thickness of at least 30 nm.

It is preferable that the above mentioned optical information recording medium further comprises a move inhibiting layer between the first protective layer and the recording layer.

It is preferable in the above mentioned optical information recording medium that the move inhibiting layer comprises a nitride-oxide of Ge, Si or a component element of the recording layer.

Moreover, the present invention can be applied to the so-called double sided adhering structure in which two substrates are arranged outside and two recording layers are arranged inside. In such a double sided structure, the information can be recorded and reproduced from both of the front surface and the back surface.

DETAILED DESCRIPTION OF THE INVENTION

Figure 1:
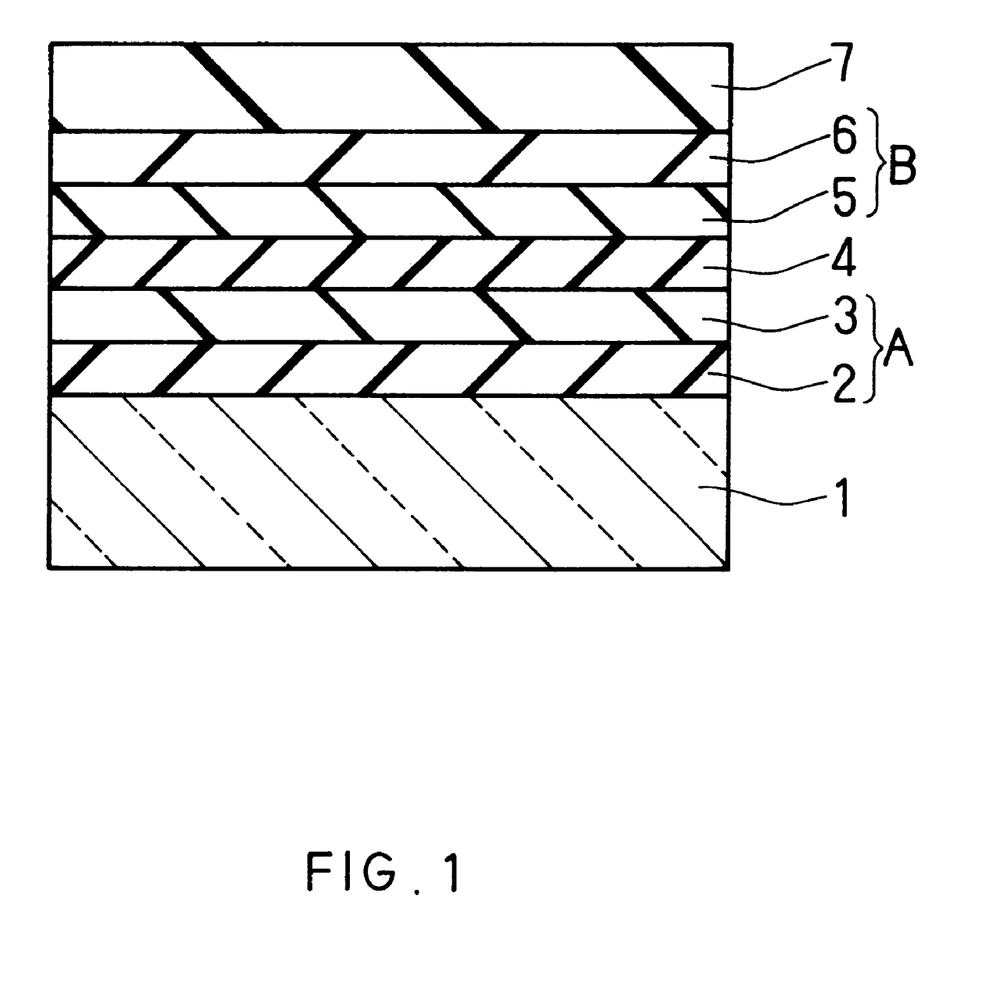
FIG. 1 is a cross sectional view showing an optical information recording medium of one embodiment of the present invention.

FIG. 1 shows the structure of an optical information recording medium of one embodiment of the present invention. A protective layer A comprising a dielectric 2 separated from a recording layer 4 and a move inhibiting layer 3, the recording layer 4, a protective layer B comprising a more inhibiting layer 5 and a dielectric layer 6 separated from the recording layer 4, and a reflective layer 7 are successively laminated on a substrate 1.

Figure 2:
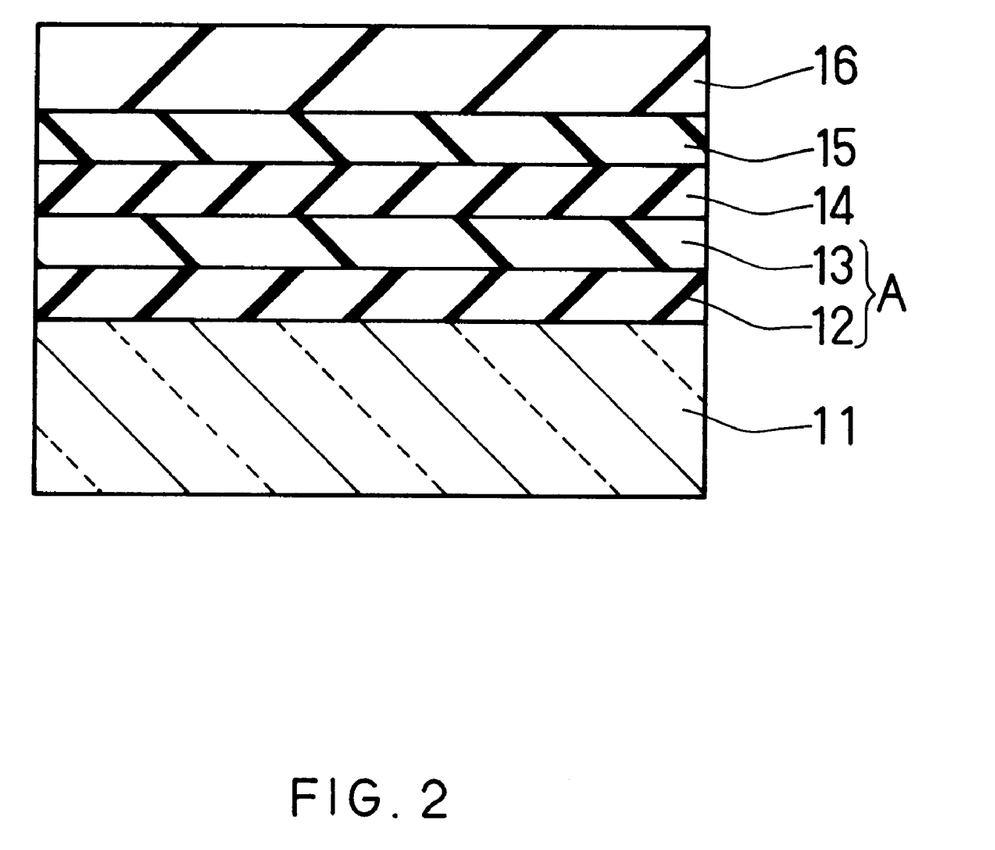
FIG. 2 is a cross sectional view showing an optical information recording medium of another embodiment of the present invention.

Moreover, FIG. 2 shows the structure of an optical information recording medium of another embodiment of the present invention. A protective layer A comprising a dielectric 12 separated from a recording layer 14 and a move inhibiting layer 13, the recording layer 14, a dielectric layer 15 and a reflective layer 16 are successively laminated on a substrate 11.

Figure 3:
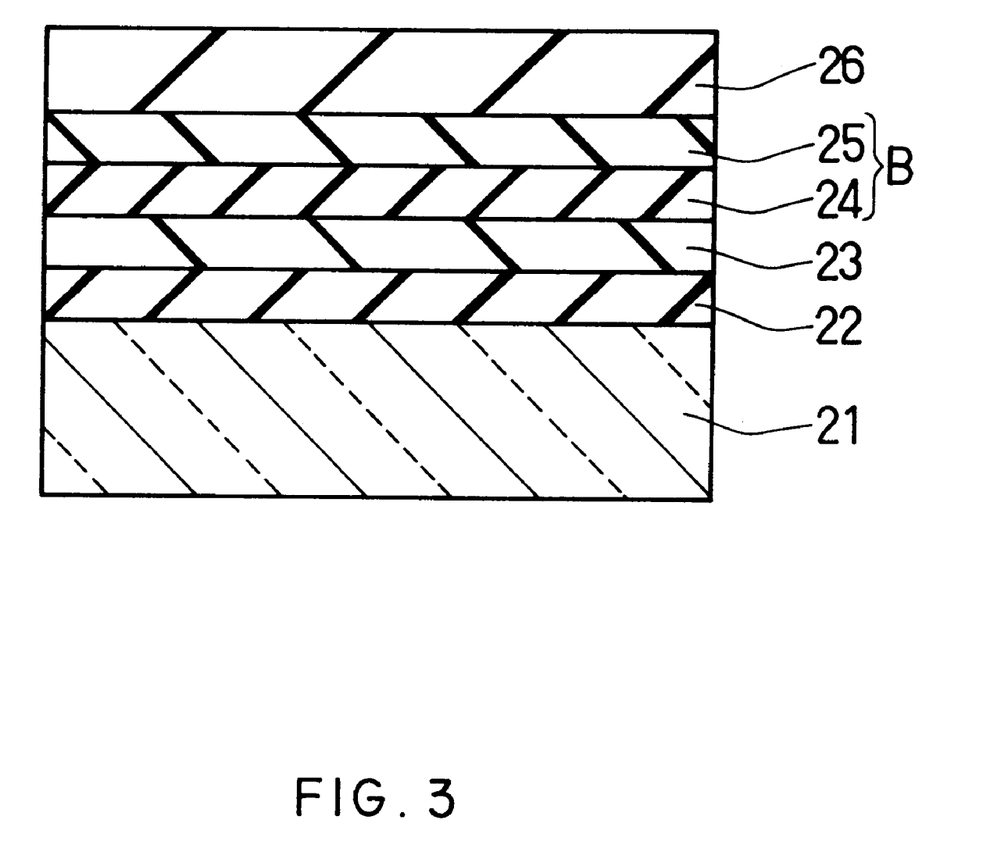
FIG. 3 is a cross sectional view showing an optical information recording medium of a further embodiment of the present invention.

Moreover, FIG. 3 shows the structure of an optical information recording medium of a further embodiment of the present invention. A dielectric layer 22, a recording layer 23, a protective layer B comprising a move inhibiting layer 24 and a dielectric 25 separated from the recording layer 23, and a reflective layer 26 are laminated on the substrate 21.

A structure other than the above three embodiments, for example, the structure in which the move inhibiting layer is not included in the protective layer A and/or protective layer B, and the structure in which the reflective layer is not provided, may be used.

In a word, one of the purposes of the present invention is to form the dielectric of the protective layer that is separated from the recording layer by a sputtering method by using a target comprising Zn, S, and Si in a mixed atmosphere comprising rare gas and at least an oxygen component.

As the substrates 1, 11, and 21 of the present invention, glass, resin or the like can be used. In general, transparent glass, quartz, polycarbonate resin, polymethyl methacrylate resin and polyolefin resin etc are used.

For the recording layers 4, 14, and 23, which are phase change media, materials that generate the optically detectable change between one crystalline state and another crystalline state can be applied. Specific materials include an alloy of Te, Se, Sb, In, Ge etc, for example, Ge—Sb—Te, In—Sb—Te, Ga—Sb, Ge—Sb, In—Ge—Sb, In—Ga—Sb, Ge—Sn—Te, Ag—Sb—Te or the like.

As mentioned above, the reflective layers 7, 16, and 26 are not always necessary for the structure of the optical information recording medium obtained by the manufacturing method of the present invention. As the material constituting the reflective layers, a single element substance or an alloy of Au, Al, Ti, Ni, Cr etc. can be used.

The target used in the present invention includes at least Zn, S and Si. The number of targets can appropriately selected. From the viewpoint of adjusting the composition of the dielectric, a multi-target arrangement that individually contains the component element is preferred. When simplification of apparatus etc. is taken into consideration, the mixture of component materials is preferred. When the mixture is used as a target, for example, the mixture of ZnS and $SiO_2$ or the like can be applied.

Moreover, as the rare gas used in the present invention, He, Ne, Ar or Xe can be used singly or by combining them. In addition, as the oxygen component, for example, oxygen molecule or ozone molecule etc. can be used.

It is preferable that the dielectric of the protective layer of the optical information recording medium obtained by the manufacturing method of the present invention is sputtered while increasing the content of the oxygen component in the mixed atmosphere with increasing distance from the recording layer, since oxygen freed from the dielectric to the recording layer can be reduced regardless of the presence or absence of the move inhibiting layer. It is preferable that the same method is applied to any one of the dielectric layers that closely contact the recording layer as in FIGS. 2 and 3.

The materials of the dielectric of the protective layer or the dielectric layer include Zn, S and Si. A specific material is composed mainly of ZnS and silicon oxide.

The main purpose of providing an oxygen component in the mixed atmosphere in forming the dielectric of the protective layer or the dielectric layer is to improve the mechanical strength during the overwrite cycle. The recording property per se becomes more excellent as the oxygen component is included. In a case where the oxygen amount is excessive, a problem is generated in that excessive oxygen in the dielectric or the dielectric layer moves to the recording layer to cause the change in the recording and/or reproducing property of the recording layer when the preservability of the dielectric or the dielectric layer was evaluated after the overwrite cycles are repeated, for example, when the dielectric of the protective layer or the dielectric layer is let stand under an atmosphere of high temperature.

In order to satisfy both the recording property during this cycle and the preservability after this cycle, the oxygen concentration in the mixed atmosphere is preferably not less than 0.1 vol. % and not more than 10 vol. %. However, in a case where the move inhibiting layer is provided for the protective layer as mentioned below, the concentration is not necessarily limited to the above mentioned range.

The move inhibiting layer is provided at the interface between the recording layer and the protective layer, wherein the component element of the recording layer and/or the component element of the dielectric of the protective layer, in particular, oxygen, moves between layers, thus inhibiting the change of the recording property of the recording layer and/or the thermal or mechanical property of the dielectric.

As the component element of the move inhibiting layer, the nitride, nitride-oxide, carbide, sulfide, fluoride etc. of the component elements of the recording layer may be used. Nitride or oxide-nitride of Si is preferred, since they have a high density film quality and thermal resistant property. Moreover, in the optical information recording medium, the change of the recording property matters so much, so that if nitride or nitride-oxide of the component element of the recording layer is applied, the phenomenon that the component elements of the recording layer disperse into the dielectric is preferably inhibited. More particularly, nitride-oxide and oxide of Ge is preferred since they satisfy the above mentioned properties. Therefore, in a case where Ge is included as a component that satisfies the thermal resistance property of the recording layer as in, for example, the Ge—Sb—Te system recording layer or the like, the structure including nitride of Ge or nitride-oxide of Ge as the move inhibiting layer is preferred.

As materials of the move inhibiting layer, materials other than the above, for example any of nitride, nitride-oxide, carbide, sulfide and fluoride of materials of the dielectric, can exhibit the effect of inhibiting at least the movement of free oxygen in the dielectric. Therefore, the film forming method for the similar structure can be applied not only to the move inhibiting layer of the protective layer, but also to the dielectric layer shown in, for example, FIG. 2 or FIG. 3.

Moreover, the atmosphere of rare gas, oxygen component and nitride component can be attained cheaply and easily by mixing rare gas with air. The desired property can be obtained by appropriately varying the content of air in accordance with the distance to the recording layer.

Hereinafter, the present invention will be explained in detail with reference to Examples.

EXAMPLE 1

An optical disc was manufactured by using a polycarbonate substrate having 120 mm diameter and a previously provided track for recording signals, a ternary material comprising Ge, Sb and Te (for example, $Ge_{2.0}Sb_{2.4}Te_{5.0}$) as the recording layer, an Al alloy (for example, $Al_{98}Cr_2$) as the reflective layer, and a target of mixed material comprising ZnS and $SiO_2$ as upper and lower protective layers. Moreover, in order to protect the thin film layer of the optical disc, a resin coat was applied onto the reflective layer. Herein, the upper and lower protective layers have a two-layered structure, each layer of which was formed by sputtering in the different atmospheric gases.

In FIG. 1, the thickness of each layer was as follows, starting from the side of the substrate. The dielectric 2 of the protective layer A was 80 nm thick, the move inhibiting layer 3 was 5 nm thick, and the recording layer 4 was 17 nm thick; and the move inhibiting layer 5 of the protective layer B was 4 nm thick, the dielectric 6 was 11 nm thick, and the reflective layer 7 was 100 nm thick.

Each of the protective layers A and B was formed by the sputtering method under the conditions where the sputtering power was 300 W; the sputtering atmosphere was a mixed gas comprising Ar, $O_2$ and $N_2$; the flow rate was 20 sccm; and the total pressure was 1 mTorr. The dielectric 2 of the protective layer A and the dielectric 6 of the protective layer B were formed in an atmosphere of mixed gas comprising argon and oxygen in which the oxygen concentration was in the range of 0 to 20 vol. %. Moreover, the move inhibiting layer 3 of the protective layer A and the move inhibiting layer 5 of the protective layer B were formed in an atmosphere of the mixed gas comprising argon and nitrogen in which the nitrogen concentration was 2 vol. %.

Moreover, the recording layer was formed by the sputtering method under the conditions where the mixed material of Ge, Sb and Te was used as a target, the sputtering atmosphere was a single gas of argon, the flow rate was 20 sccm, the total pressure was 1 mTorr, and the sputtering power was 80 W. The reflective layer was formed by the sputtering method under the conditions where the mixed material of Al and Cr was used as a target, the sputtering atmosphere was a single gas of argon, the flow rate was 20 sccm, the total pressure was 2 mTorr, and the sputtering power was 200 W.

The obtained optical disc was measured by using a signal evaluation apparatus having an optical system of 680 nm wavelength and 0.55 lens aperture number (NA). CNR (the carrier-to-noise ratio) of a 5 MHz signal was measured after overwriting was conducted 10 times and 500000 times while rotating at the rate of 10 m/s at 5 MHz and 3 MHz by turns.

Moreover, after the heat resistance test in which this optical disc was let stand in dry nitrogen at 90° C. for 500 hours, the CNR of the track was measured after 500000 times of overwrite cycles were conducted.

Moreover, the cycle property and the heat resistance property of the optical disc were evaluated. At this time, a CNR of 50 dB or more is defined as a standard.

The relation between the oxygen concentration in an atmosphere and the cycle property and the heat resistance property when the dielectric 2 of the protective layer A and the dielectric 6 of the protective layer B were formed are shown in Table 1.

When the oxygen concentration is less than 0.1 vol. %, the cycle property is deteriorated. It is thought that this is because the mechanical properties of the dielectric 2 and dielectric 6 were not recovered.

On the other hand, when the oxygen concentration is more than 10 vol. %, the cycle property is good, but the heat resistance property is deteriorated. It is thought that this is because the quantity of oxygen bonding to the component element of the recording layer after passing through the move inhibiting layer 3 and the move inhibiting layer 5 was radically increased.

Therefore, the oxygen concentration for obtaining the excellent cycle property and heat resistance property could be recognized to be not less than 0.1 vol. % and not more than 10 vol. %.

TABLE 1

| Oxygen concentration in an atmosphere at the time of forming the dielectric layer of the protective layer A (vol. %) | Oxygen concentration in an atmosphere at the time of forming the dielectric layer of the protective layer B (vol. %) | CNR after overwriting 10 times (dB) | CNR after overwriting 500000 times (dB) | CNR after the test at 90° C. for 500 hours (dB) |
|---|---|---|---|---|
| 0 | 0 | 59 | 40 | 40 |
| 0.05 | 0.05 | 58 | 45 | 44 |
| 0.1 | 0.1 | 59 | 51 | 51 |
| 0.5 | 0.5 | 58 | 51 | 51 |
| 1.0 | 1.0 | 59 | 52 | 52 |
| 3.0 | 3.0 | 59 | 52 | 52 |
| 5.0 | 5.0 | 58 | 52 | 51 |
| 10.0 | 10.0 | 59 | 51 | 51 |
| 15.0 | 15.0 | 59 | 52 | 45 |
| 20.0 | 20.0 | 59 | 51 | 35 |

In this example, as the rare gas component of the mixed gas, argon was used. Also in a case where an inactive gas such as He, Ne, and Xe was used, a similar effect can be obtained.

Moreover, in order to make good use of the effect of the mechanical strength attained by sputtering in a mixed atmosphere where oxygen is mixed into the rare gas, the film thickness of the dielectric layers 2 and 6 was desirably not less than 10 nm.

Moreover, in this example, if the film thickness of the move inhibiting layers 3 and 5 was not less than 3 nm, an effect of inhibiting oxygen from dispersing into the recording layer can be obtained.

EXAMPLE 2

An optical disc was manufactured by using the same substrate as Example 1, a ternary material comprising Ge, Sb and Te (for example, $Ge_{2.0}Sb_{2.4}Te_{5.0}$) as the recording layer, an Al alloy (for example, $Al_{98}Cr_2$) as the reflective layer, and a target of mixed material comprising ZnS and $SiO_2$ as upper and lower protective layers. Moreover, in order to protect a thin film layer of the optical disc, a resin coat was applied on the reflective layer. Herein, the upper and lower protective layers have a two-layered structure, each layer of which was formed by sputtering in the different atmospheric gases.

In FIG. 1, the thickness of each layer was as follows, starting from the side of the substrate. The dielectric 2 of the protective layer A was 80 nm thick, the move inhibiting layer 3 was 5 nm thick, and the recording layer 4 was 17 nm thick; and the move inhibiting layer 5 of the protective layer B was 4 nm thick, the dielectric 6 was 11 nm thick, and the reflective layer 7 was 100 nm thick.

Each of the protective layers A and B was formed by the sputtering method under the conditions where the sputtering power was 300 W, the sputtering atmosphere was mixed gas comprising Ar, $O_2$ and $N_2$, the flow rate was 20 sccm, and the total pressure was 1 mTorr. The dielectric 2 of the protective layer A and the dielectric 6 of the protective layer B were formed in an atmosphere of mixed gas comprising argon and nitrous oxide in which the nitrous oxide concentration was in the range of 0 to 20 vol. %. Moreover, the move inhibiting layer 3 of the protective layer A and the move inhibiting layer 5 of the protective layer B were formed in an atmosphere of mixed gas comprising argon and nitrogen in which the nitrogen concentration was 2 vol. %.

Moreover, the recording layer was formed by sputtering under the conditions where the mixed material comprising Ge, Sb and Te was used as a target, the sputtering atmosphere was a single gas of argon, the flow rate was 20 sccm, the total pressure was 1 mTorr, ind the sputtering power was 80 W. The reflective layer was formed by sputtering under the conditions where the mixed material comprising Al and Cr was used as a target, the sputtering atmosphere was a single gas of argon, the flow rate was 20 sccm, the total pressure was 2 mTorr, and the sputtering power was 200 W.

The obtained optical disc was evaluated by the same method as Example 1. The relation between the concentration of nitrous oxide in an atmosphere, and the cycle property and heat resistance property when the dielectric 2 of the protective layer A and the dielectric 6 of the protective layer B were formed is shown in Table 2.

When the concentration of nitrous oxide is less than 0.1 vol. %, the cycle property is deteriorated. It is thought that this is because the mechanical properties of the dielectric 2 and dielectric 6 are not recovered.

On the other hand, when the concentration of nitrous oxide is more than 15 vol. %, the cycle property is good, but the heat resistance property is deteriorated. It is thought that this is because the quantity of oxygen bonding to the component element of the recording layer after moving through the move inhibiting layer 3 and move inhibiting layer 5 is radically increased.

Therefore, the concentration of nitrous oxide for obtaining the excellent cycle property and heat resistance property could be recognized to be not less than 0.1 vol. % and not more than 15 vol. %.

TABLE 2

| Nitrous oxide concentration in an atmosphere at the time of forming the dielectric layer of the protective layer A (vol. %) | Nitrous oxide concentration in an atmosphere at the time of forming the dielectric layer of the protective layer B (vol. %) | CNR after over-writing 10 times (dB) | CNR after over-writing 500000 times (dB) | CNR after the test at 90° C. for 500 hours (dB) |
|---|---|---|---|---|
| 0 | 0 | 59 | 40 | 40 |
| 0.05 | 0.05 | 58 | 46 | 43 |
| 0.1 | 0.1 | 59 | 51 | 51 |
| 0.5 | 0.5 | 58 | 52 | 52 |
| 1.0 | 1.0 | 59 | 52 | 52 |
| 3.0 | 3.0 | 59 | 51 | 51 |
| 5.0 | 5.0 | 58 | 52 | 51 |
| 10.0 | 10.0 | 59 | 51 | 51 |
| 15.0 | 15.0 | 59 | 51 | 51 |
| 20.0 | 20.0 | 59 | 51 | 37 |

In this example, as the rare gas component of the mixed gas, argon was used. Also if an inactive gas such as He, Ne, and Xe is used, the similar effect could be obtained.

Moreover, in order to make good use of the effect of the mechanical strength attained by sputtering in an atmosphere where oxygen is mixed into rare gas, the film thickness of the dielectric layers 2 and 6 was desirably not less than 10 nm.

Moreover, in this example, if the film thickness of the move inhibiting layers 3 and 5 was not less than 3 nm, the effect of inhibiting oxygen from dispersing into the recording layer can be obtained.

Comparative Example 1

An optical disc was manufactured using the same substrate as Example 1, a ternary material comprising Ge, Sb and Te of Example 1 as the recording layer, an Al alloy of Example 1 as the reflective layer, and a target of mixed material comprising ZnS and $SiO_2$ as the upper and lower, first and second dielectric layers.

The thickness of each layer was as follows, starting from the side of the substrate. The first dielectric layer was 85 nm thick, the recording layer was 17 nm thick, the second dielectric layer was 15 nm thick, and the reflective layer 7 was 100 nm thick. As to the conditions for forming each layer, the same sputtering method as Example 1 was conducted except for the sputtering atmosphere of the first and second dielectric layers. The sputtering atmosphere of the first and second dielectric layers was a mixed gas comprising argon and nitrogen in which the nitrogen concentration was 3 vol. %. Moreover, in order to protect the thin film layer of the optical disc, a resin coat was applied onto the reflective layer as in Example 1.

The cycle property and heat resistance property of this optical disc were evaluated by the same method as Example 1. The results are shown in Table 3. As is apparent from Table 3, no change in the properties of CNR was found between after overwriting was conducted 500000 times and after the heat resistance test with 500000 times of overwriting. However, CNRs of both after 500000 times of overwriting and after the heat resistance test were 48 dB, which were below the standard value.

This result shows that since the quantity of gaseous oxygen freed from the first and second dielectric layers due to the cycle was reduced by adding nitrogen, there was no change of the properties caused by the oxidation of Ge in the recording layer between before and after the heat resistance test.

Comparative Example 2

An optical disc was manufactured using the same substrate as Example 1, a ternary material comprising Ge, Sb and Te the same as Example 1 as the recording layer, an Al alloy the same as Example 1 as the reflective layer, and a mixed material comprising ZnS and $SiO_2$ as the upper and lower, first and second dielectric layers.

The thickness of each layer was as follows, starting from the side of the substrate. The first dielectric layer was 85 nm thick, the recording layer was 17 nm thick, the second dielectric layer was 15 nm thick, and the reflective layer 7 was 100 nm thick. As to the conditions for forming the layers, the same sputtering method as Example 1 was conducted except for the sputtering atmosphere of the first and second dielectric layers. The sputtering atmosphere of the first and second dielectric layers was a mixed gas comprising argon and oxygen in which the oxygen concentration was 3 vol. %. Moreover, in order to protect the thin film layer of the optical disc, a resin coat was applied onto the reflective layer as in Example 1.

The cycle property and heat resistance property of this optical disc were evaluated by the same method as Example 1. The results are shown in Table 3. As is apparent from Table 3, the CNR after 500000 times of cycles was 54 dB, exhibiting an excellent property, however, the CNR after the heat resistance test was decreased to 30 dB.

This is thought because the strength property and the cycle property were improved since the oxygen deficiency in the dielectric layer was compensated by adding oxygen, but that the heat resistance property was deteriorated since gaseous oxygen present in the film was freed due to the cycle and bonded to Ge of the recording layer, thus decreasing the crystallization temperature and making the amorphous phase unstable.

EXAMPLE 3

An optical disc was manufactured using the same substrate as Example 1, a ternary material comprising Ge, Sb and Te the same as Example 1 as the recording layer, and an Al alloy the same as Example 1 as the reflective layer, and providing the protective layers A and B having a two layered structure at the upper and lower sides of the recording layer. Moreover, in order to protect the thin film layer of the optical disc, a resin coat was applied onto the reflective layer.

In FIG. 1, the thickness of each layer was as follows, starting, from the side of the substrate. The dielectric 2 of the protective layer A was 80 nm thick, the move inhibiting layer 3 of the protective layer A was 8 nm thick, the recording layer 4 was 17 nm thick, the move inhibiting layer 5 of the protective layer was 8 nm thick, the dielectric 6 of the protective layer B was 11 nm thick, and the reflective layer 7 was 100 nm thick.

As to the conditions for forming each layer, the same sputtering method as Example 1 was conducted for all layers except for the protective layers A and B. The dielectric 2 and dielectric 6 of the protective layer A and B were formed by sputtering under the conditions where the sputtering atmosphere was the mixed gas comprising argon and oxygen in which the oxygen concentration was 1 vol. %, the flow rate was 20 sccm, the total pressure was 1 mTorr, the mixed material comprising ZnS and $SiO_2$ was used as the target, and the sputtering power was 300 W. Moreover, for the move inhibiting layer 3 and/or the move inhibiting layer 5 of the protective layers A and B, a nitride thin film of Ge was formed by a reactive sputtering method under the conditions where the target was Ge, the sputtering atmosphere was a mixed gas comprising argon and nitrogen in which the nitrogen concentration was 20 vol. %, the flow rate was 20 sccm, the total pressure was 5 mTorr, and the sputtering power was 500 W.

An optical disc in which nitride-oxide of Ge was formed on both the protective layer A and protective layer B was defined as an optical disc A, an optical disc in which nitride-oxide of Ge was formed on only the move inhibiting layer 3 of the protective layer A was defined as an optical disc B, and an optical disc in which nitride-oxide of Ge was formed on only the move inhibiting layer 5 of the protective layer B was defined as an optical disc C. Among the optical disc B and optical disc C, the remaining move inhibiting layer 5 (in the case of the optical disc B) or the remaining move inhibiting layer 3 (in the case of the optical disc C) was formed by sputtering the mixed material comprising ZnS and $SiO_2$ in an atmosphere of mixed gas comprising argon and nitrogen in which the nitrogen concentration was 2 vol. %.

The cycle property and heat resistance property of these optical discs were evaluated by the same method as Example 1 and the results are shown in Table 3.

As shown in Table 3, the excellent cycle property and heat resistance property could be obtained in all of the optical discs A, B and C. This is thought to occur because oxygen freed from the dielectric 2 of the protective layer A and/or the dielectric 6 of the protective layer B due to the heat resistance test was inhibited from dispersing into the recording layer by making the move inhibiting layer 3 of the protective layer A and the move inhibiting layer 5 of the protective layer B from nitride-oxide of Ge.

In this example, nitride-oxide of Ge was used as the component material of the move inhibiting layer 3 and/or the move inhibiting layer 5. However, as a result of investigation by using nitride, nitride-oxide, carbide, sulfide, fluoride etc., any of the above mentioned materials could provide a more improved cycle property and heat resistance property as compared with the prior art. In particular, in the case of using nitride of Ge, nitride or nitride-oxide of Si, or nitride or nitride-oxide of the component element of the recording layer 5, excellent cycle property and heat resistance property could be obtained.

In this example, as the rare gas component of the mixed gas, argon was used. Also in a case where an inactive gas such as He, Ne, and Xe is used, a similar effect can be obtained.

Moreover, if the oxygen concentration of the atmosphere when the dielectric 2 of the protective layer A and the dielectric 6 of the protective layer B were formed is in the range of 0.1 vol. % to 10 vol. %, the excellent cycle property and heat resistance property can be obtained.

EXAMPLE 4

An optical disc was manufactured using the same substrate as Example 1, a ternary material comprising Ge, Sb and Te the same as Example 1 as the recording layer, an Al alloy the same as Example 1 as the reflective layer, and providing a protective layer A having a two-layered structure on the recording layer at the side of substrate, and a single-layered dielectric layer between the recording layer and the reflective layer. Moreover, in order to protect the thin film layer of the optical disc, a resin coat was applied onto the reflective layer.

In FIG. 2, the thickness of each layer was as follows, starting, from the side of the substrate. The dielectric 12 of the protective layer A was 80 nm thick, the move inhibiting layer 13 was 8 nm thick, and the recording layer 14 was 17 nm thick, the dielectric layer 15 was 15 nm thick, and the reflective layer 16 was 100 nm thick.

As to the conditions for forming each layer, the same sputtering method as Example 1 was conducted for all layers except for the protective layer A and the dielectric layer. The dielectric 12 of the protective layer A was formed by sputtering the mixed materials comprising ZnS and $SiO_2$ in an atmosphere of the mixed gas comprising argon and oxygen in which the oxygen concentration was 3 vol. %. The move inhibiting layer 13 of the protective layer A and the dielectric layer 15 were formed in the same conditions as Example 2 with each material.

Moreover, an optical disc in which the move inhibiting layer 13 of the protective layer A and the dielectric layer 15 were formed by sputtering the mixed material comprising ZnS and $SiO_2$ in an atmosphere of the mixed gas comprising argon and nitrogen where the nitrogen concentration was 2 vol. % was defined as an optical disc D; an optical disc in which the move inhibiting layer 13 of the protective layer A was formed by nitride-oxide of Ge, the dielectric layer 15 was formed by sputtering the mixed material comprising ZnS and $SiO_2$ in an atmosphere of the mixed gas comprising argon and nitrogen where the nitrogen concentration was 2 vol. % was defined as an optical disc E; and an optical disc in which the move inhibiting layer 13 of the protective layer A was formed by sputtering the mixed material comprising ZnS and $SiO_2$ in an atmosphere of the mixed gas comprising argon and nitrogen in which the nitrogen concentration was 2 vol. %, and the dielectric layer 15 was formed by the same nitride-oxide of Ge as in the move inhibiting layer 13 of the protective layer A of the optical disc E was defined as an optical disc F.

The cycle property and heat resistance property of these discs were evaluated by the same method as Example 1 and the evaluation results are shown in Table 3. As shown in Table 3, each of the optical discs had excellent cycle properties and heat resistance properties.

In this example, the move inhibiting layer 13 of the optical disc E and the dielectric layer 15 of the optical disc F were composed of nitride-oxide of Ge. However, as a result of the investigation by using nitride, nitride-oxide, carbide, sulfide, fluoride etc., any of the above mentioned materials could provide a more improved cycle property and heat resistance property as compared with the prior art. In particular, in the case of the investigation using nitride, oxide or fluoride of various metals, when nitride of Ge, nitride or nitride-oxide of Si, or nitride or nitride-oxide of the component element of the recording layer 15 was used, the excellent cycle property and heat resistance property could be obtained.

Moreover, an excellent cycle property and heat resistance property can be obtained when the oxygen concentration in the atmosphere at the time of formation of the dielectric 12 of the protective layer A is in the range of 0.1 to 10 vol. %.

Moreover, in this Example, as a gas having an oxidation effect in the rare gas, oxygen was used. However, also in a case where nitrous oxide was used instead of oxygen, the cycle property and heat resistance property were improved. In particular, if the concentration of nitrous oxide was made to be in the range of 0.1 to 15 vol. %, the excellent cycle property and heat resistance property could be obtained.

In this example, as the rare gas (component of the mixed gas, argon was used. Also when an inactive gas such as He, Ne, and Xe is used, the similar effect can be obtained.

EXAMPLE 5

An optical disc was manufactured using the same substrate as Example 1, a ternary material composed of Ge, Sb and Te the same as Example 1 as the recording layer, an Al alloy the same as Example 1 as the reflective layer, and providing a protective layer A having a two-layered structure on the recording layer at the side of the substrate, and a dielectric layer having a single-layered structure between the recording layer and the reflective layer. Moreover, in order to protect the thin film layer of the optical disc, a resin coat was applied onto the reflective layer.

In FIG. 2, the thickness of each layer was as follows, starting from the side of the substrate. The dielectric 12 of the protective layer A was 80 nm thick, the move inhibiting layer 13 was 8 nm thick, the recording layer 14 was 17 nm thick, the dielectric layer 15 was 15 nm thick, and the reflective layer 16 was 100 nm thick.

As to the conditions for forming each layer, the same sputtering method as Example 1 was conducted for all layers except for the protective layer A and the dielectric layer. The dielectric 12 of the protective layer A and the dielectric layers 15 were formed by sputtering the mixed materials comprising ZnS and SiO$_2$ in an atmosphere of the mixed gas comprising argon and oxygen in which the oxygen concentration was 1 vol. %. The move inhibiting layer 13 was formed by nitride-oxide of Ge. The protective layer A and the dielectric layer were formed under the same conditions as Example 2 with each material.

The cycle property and heat resistance property of these discs were evaluated by the same method as Example 1 and the evaluation results are shown in Table 3. As shown in Table 3, each of the optical discs had excellent cycle properties and heat resistance properties.

In this example, the move inhibiting layer 13 of the protective layer A and the dielectric layer 15 were composed of nitride-oxide of Ge. However, as a result of the investigation by using nitride, nitride-oxide, carbide, sulfide, fluoride etc., any of the above mentioned materials could provide a more improved cycle property and heat resistance property as compared with the prior art. In particular, in the case of the investigation using nitride, oxide or fluoride of various metals, when nitride of Ge, nitride or nitride-oxide of Si, or nitride or nitride-oxide of the component element of the recording layer is used, the excellent cycle property and heat resistance property could be obtained.

Moreover, an excellent cycle property and heat resistance property can be obtained when the oxygen concentration in an atmosphere at the time of forming the dielectric 12 of the protective layer A and the dielectric layer 15 is in the range of 0.1 to 10 vol. %.

Moreover, in this Example, as a gas having an oxidation effect in the rare gas, oxygen was used. However, also in a case where nitrous oxide was used instead of oxygen, the cycle property and heat resistance property were improved. In particular, if the concentration of nitrous oxide was made to be in the range of 0.1 to 15 vol. %, the excellent cycle property and heat resistance property could be obtained.

In particular, the dielectric layer 15 contacts the recording layer 14. However, it is presumed that the dielectric layer 15 is made thinner than the protective layer A (the dielectric layer 12 and move inhibiting layer 13) and contacts to the reflective layer 16, so that heat easily can be released and little gaseous oxygen of the thin film was freed due to the overwrite cycle. Thus, the content of oxygen dispersing into the recording layer at high temperature was restrained, and an excellent heat resistance property can be obtained.

In this example, as the rare gas component of the mixed gas, argon was used. Also when an inactive gas such as He, Ne, and Xe is used, the similar effect can be obtained.

EXAMPLE 5

An optical disc was manufactured using the same substrate as Example 1, a ternary material composed of Ge, Sb and Te the same as Example 1 as the recording layer, an Al alloy the same as Example 1 as the reflective layer, and providing a single layered dielectric layer having a single-layered structure on the recording layer at the side of the substrate, and a protective layer B having a two-layered structure between the recording layer and the reflective layer. Moreover, in order to protect the thin film layer of the optical disc, a resin coat was applied onto the reflective layer.

In FIG. 3, the thickness of each layer was as follows, starting from the side of the substrate. The dielectric layer 22 was 85 nm thick, the recording layer 23 was 17 nm thick, the move inhibiting layer 24 of the protective layer B was 8 nm, the dielectric 25 was 11 nm and the reflective layer 26 was 100 nm.

As to the conditions for forming each layer, the same sputtering method as Example 1 was conducted for all layers except for the protective layer A and the dielectric layer. The dielectric 25 of the protective layer B was formed by sputtering under the conditions where the mixed material comprising ZnS and SiO$_2$ was used as a target, the atmosphere was the mixed gas comprising argon and oxygen in which the oxygen concentration was 3 vol. %, the flow rate was 20 sccm, the total pressure was 1 mTorr, and the sputtering power was 300 W.

Moreover, an optical disc in which the dielectric layer 22 and the move inhibiting layer 24 of the protective layer B were formed by sputtering under the conditions where the mixed material comprising ZnS and SiO$_2$ was used as a target, an atmosphere was the mixed gas comprising argon and nitrogen in which nitrogen concentration was 2 vol. %, the flow rate was 20 sccm, the total pressure was 1 mTorr, and the sputtering power was 300 W was defined as an optical disc G. Moreover, an optical disc in the dielectric layer 22 was formed by sputtering under the conditions where the mixed material comprising ZnS and SiO$_2$ was used as a target, an atmosphere was the mixed gas comprising argon and nitrogen in which the nitrogen concentration was 2 vol. %, the flow rate was 20 sccm, the total pressure was 1 mTorr, and the sputtering power was 300 W; and the move inhibiting layer 24 of the protective layer B was formed by nitride-oxide of Ge by the same sputtering conditions described as in Example 2 was defined as an optical disc H.

The cycle property and heat resistance property of these discs were evaluated by the same method as Example 1 and the evaluation results are shown in Table 3. As shown in Table 3, each of the optical discs had excellent cycle properties and heat resistance properties.

In this example, the move inhibiting layer 24 of the protective layer B of the optical disc H was composed of nitride-oxide of Ge. However, as a result of the investigation using nitride, nitride-oxide, carbide, sulfide, fluoride etc., any of the above mentioned materials could provide a more improved cycle property and heat resistance property as compared with the prior art. In particular, when the investigation was conducted by using nitride, oxide or fluoride of various metals, if nitride of Ge, nitride or nitride-oxide of Si, or nitride or nitride-oxide of the component element of the recording layer 23 were used, the excellent cycle property and heat resistance property could be obtained.

Moreover, the excellent cycle property and heat resistance property can be obtained when the oxygen concentration in an atmosphere at the time of the formation of the dielectric 25 of the protective layer B is in the range of 0.1 to 10 vol. %.

In this example, as the rare gas component of the mixed gas, argon was used. Also when an inactive gas such as He, Ne, and Xe is used, the similar effect can be obtained.

When comparing Example 1 to Example 5, the optical disc E, the optical disc F and Example 4 are characterized in that the cycle properties and the heat resistance properties are excellent, and the formation step is simple because the total number of layers is five.

EXAMPLE 7

An optical disc having the same structure of the optical disc of Example 1 was manufactured using the dielectric layer 2 of the protective layer A and the dielectric 6 of the protective layer B by sputtering by using the mixed material comprising ZnS and SiO$_2$ as a target in an atmosphere of mixed gas comprising argon, oxygen and nitrogen instead of the mixed gas comprising argon and oxygen of Example 1. Herein, in the mixed gas, the oxygen concentration was 3 vol. % and the nitrogen concentration was 1 vol. %. The flow rate, the total pressure and sputtering power were the same as Example 1.

The cycle property and the heat resistance property of this optical disc were evaluated by the same method as Example 1 and the evaluation results are shown in Table 3. As shown in Table 3, the excellent cycle property and heat resistance property could be obtained.

In this Example, the structure of the optical disc was the same as Example 1. However, if any of the structures of Example 2, 3, 4 or 5 are used, the excellent cycle property and heat resistance property could be obtained when the dielectric of the protective layer or the dielectric layer is formed by sputtering the mixed material of ZnS and SiO$_2$ in an atmosphere of the mixed gas comprising argon, oxygen and nitrogen.

Moreover, an excellent cycle property and heat resistance property can be obtained when the oxygen concentration in the mixed gas comprising argon, oxygen and nitrogen at the time of film formation is in the range of 0.1 to 10 vol. %.

In this example, as the rare gas component of the mixed gas, argon was used. Also when an inactive gas such as He, Ne, and Xe is used, the similar effect can be obtained.

EXAMPLE 8

An optical disc has the same structure of the optical disc of Example 1. The dielectric layer 2 of the protective layer A and the dielectric 6 of the protective layer B were formed by sputtering the mixed material comprising ZnS and SiO$_2$ in an atmosphere of the mixed gas comprising argon and air instead of the mixed gas comprising argon and oxygen of Example 1. Herein, in the mixed gas, the concentration ratio of argon to air was 99 to 3. The flow rate, the total pressure and the sputtering power were the same as Example 1.

The cycle property and the heat resistance property of this optical disc were evaluated by the same method as Example 1 and the evaluation results are shown in Table 3. As shown in Table 3, the excellent cycle property and heat resistance property could be obtained.

In this Example, the structure of the optical disc was the same as Example 1. However, if any of the structures of the optical discs of Examples 2, 3, 4 or 5 are used, the excellent cycle property and heat resistance property could be obtained, when the dielectric of the protective layer or the dielectric layer is formed by sputtering the mixed material of ZnS and SiO$_2$ in an atmosphere of the mixed gas comprising argon and air. Herein, it is preferable that the ratio of argon to air be in the range of 99.9:0.1 to 95:5.

In this example, as the rare gas component of the mixed gas, argon was used. Also when an inactive gas such as He, Ne, and Xe is used, the similar effect can be obtained.

EXAMPLE 9

An optical disc having the same structure as the Comparative Examples 1 and 2 was manufactured using the same substrate as Example 1, a ternary material comprising Ge, Sb and Te the same as Example 1 as the recording layer, an Al alloy the same as Example 1 as the reflective layer, and the mixed material comprising ZnS and SiO$_2$ as the upper and lower side of the dielectric layers that sandwich the recording layer. Moreover, in order to protect the thin film layer of the optical disc, a resin coat was applied onto the reflective layer. The difference in the comparative Examples 1 and 2 is that this is a single-layered structure in which upper and lower dielectric layers were formed by sputtering the method in which the component of the atmospheric gas continuously varies.

The thickness of each layer was as follows, starting from the side of the substrate. The first dielectric layer was 85 nm thick, the recording layer was 17 nm thick, the second dielectric layer was 15 nm, the reflective layer was 100 nm. As to the conditions for forming each layer the same sputtering method as Example 1 was conducted for all layers except for the first and second dielectric layers. The first and second dielectric layers were formed by sputtering in an atmosphere of the mixed gas comprising argon and oxygen in which the oxygen concentration was 2 vol. % at the side opposite to the recording layer (the side of the substrate or the side of the reflective layer). The mixed ratio of oxygen was gradually replaced with that of nitrogen closer to the recording layer, and at the side contacting to the recording layer, the film forming was conducted by sputtering in an atmosphere of the mixed gas comprising 2 vol. % of argon and nitrogen.

The cycle property and heat resistance property of these discs were evaluated by the same method as Example 1 and the evaluation results are shown in Table 3. As shown in Table 3, each optical disc had excellent cycle properties and heat resistance properties.

Moreover, an excellent cycle property and heat resistance property could be obtained when the oxygen concentration of the first and second protective layers at the side contacting the recording layer at the time of film formation was in the range of 0 to 10 vol. %, and when the nitrogen concentration at the opposite side of the recording layer of the first and second protective layers at the time of the film formation was in the range of 0 to 5 vol. %.

In this example, as the rare gas component of the mixed gas, argon was used. Also when an inactive gas such as He, Ne, and Xe is used, the similar effect can be obtained.

TABLE 3

|  |  | Initial CNR (dB) | CNR after overwriting 500000 times (dB) | CNR after the test at 90° C. for 500 hours (dB) |
| --- | --- | --- | --- | --- |
| Comparative Example 1 |  | 59 | 48 | 48 |
| Comparative Example 2 |  | 58 | 54 | 30 |
| Example 3 | Disc A | 58 | 53 | 53 |
| Example 3 | Disc B | 59 | 53 | 53 |
| Example 3 | Disc C | 58 | 52 | 52 |
| Example 4 | Disc D | 59 | 56 | 56 |
| Example 4 | Disc E | 58 | 57 | 57 |
| Example 4 | Disc F | 59 | 56 | 56 |
| Example 5 |  | 59 | 55 | 55 |
| Example 6 | Disc G | 59 | 51 | 51 |
| Example 6 | Disc H | 59 | 52 | 52 |
| Example 7 |  | 59 | 51 | 51 |
| Example 8 |  | 59 | 51 | 51 |
| Example 9 |  | 59 | 51 | 51 |

Finally, it is understood that the invention may be embodied in other specific forms without departing from the spirit or essential characteristics thereof. The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. A method for manufacturing an optical information recording medium comprising a recording layer that comprises a material that changes reversibly between optically identifiable states by irradiation with a laser beam and a first protective layer comprising a first dielectric layer that is spaced from the recording layer, the method comprising forming the first dielectric layer by sputtering a target comprising Zn, S and Si in a mixed atmosphere comprising rare gas and at least one gas component having an oxidizing effect, the first dielectric layer having a variation in the direction of the layer thickness in at least one of the identity or amount of components in the composition.

2. The method for manufacturing an optical information recording medium according to claim 1, wherein the recording layer is sandwiched by a second dielectric layer and the protective layer, and said second dielectric layer is formed of the same component material as the first dielectric layer and the composition of said component material is the same or varies in the direction of the film thickness of the second dielectric layer.

3. The method for manufacturing an optical information recording medium according to claim 2, wherein the second dielectric layer is formed by sputtering by the use of a target comprising Zn, S and Si in a mixed atmosphere comprising rare gas and a gas component having at least an oxidation effect.

4. The method for manufacturing an optical information recording medium according to claim 2, wherein a reflective layer is further provided, with the second dielectric layer being disposed between the reflective layer and the recording layer, the reflective layer and the second dielectric layer being provided at a side of the recording layer opposite to a side where laser beams are incident during use.

5. The method for manufacturing an optical information recording medium according to claim 4, wherein the thickness of the reflective layer is not less than 30 nm.

6. The method for manufacturing an optical information recording medium according to claim 4, wherein the film thickness of the second dielectric layer is up to 30 nm.

7. The method for manufacturing an optical information recording medium according to claim 1, wherein the protective layer is formed between the recording layer and a substrate.

8. The method for manufacturing an optical information recording medium according to claim 1, wherein the recording layer is sandwiched by the first protective layer and a second protective layer that comprises a second dielectric layer that is spaced from the recording layer.

9. The method for manufacturing an optical information recording medium according to claim 1, wherein the protective layer has a two-layered laminated structure.

10. The method for manufacturing an optical information recording medium according to claim 1, wherein the composition of the mixed atmosphere is varied so that the content of the gas component having an oxidation effect in the first dielectric layer increases with increasing distance from the recording layer.

11. The method for manufacturing an optical information recording medium according to claim 1, wherein a move inhibiting layer that inhibits one of a component element of the first dielectric layer and a component element of said recording layer from moving into the other of said recording layer and said first dielectric layer is provided between the first dielectric layer and the recording layer.

12. The method for manufacturing an optical information recording medium according to claim 11, wherein the material of the move inhibiting layer is at least one nitride or nitride-oxide of Ge, Si or component elements of said recording layer.

13. The method for manufacturing an optical information recording medium according to claim 1, wherein the thickness of the first dielectric layer is not less than 30 nm.

14. The method for manufacturing an optical information recording medium according to claim 1, wherein the recording layer comprises at least Ge, Sb and Te as component elements.

15. The method for manufacturing an optical information recording medium according to claim 1, wherein the gas component having an oxidation effect in the mixed atmosphere is oxygen.

16. The method for manufacturing an optical information recording medium according to claim 15, wherein the oxygen concentration in the mixed atmosphere is not less than 0.1 vol. % and not more than 10 vol. %.

17. The method for manufacturing an optical information recording medium according to claim 1, wherein a nitrogen component is further contained in the mixed atmosphere at a concentration not less than 0.1 vol. % and not more than 10 vol. %.

18. The method for manufacturing an optical information recording medium according to claim 1, wherein the mixed atmosphere is a mixed gas comprising rare gas and air.

19. The method for manufacturing an optical information recording medium according to claim 1, wherein the gas component having an oxidation effect in the mixed atmosphere is nitrous oxide.

20. The method for manufacturing an optical information recording medium according to claim 19, wherein the concentration of nitrous oxide in the mixed atmosphere is not less than 1 vol. % and not more than 10 vol. %.

21. An optical information recording medium prepared according to a method of claim 1.

22. An optical information recording medium, comprising:
a substrate;
a recording layer of a material that changes reversibly between optically identifiable states by irradiation with a laser beam; and
a first protective layer comprising a first dielectric layer spaced from the recording layer, the first dielectric layer being formed from Zn, S, Si and a component having an oxidizing effect,
wherein the first dielectric layer has a variation in the direction of the layer thickness in at least one of the identity or amount of component in the dielectric.

23. The optical information recording medium according to claim 22, wherein the component having an oxidizing effect is oxygen.

24. The optical information recording medium according to claim 23, wherein the component having an oxidizing effect is nitrous oxide.

25. The optical information recording medium according to claim 22, further comprising a reflective layer at a side of the recording layer opposite a side where laser beams are incident in use.

26. The optical information recording medium according to claim 25, further comprising a second dielectric layer formed of the same component material as the first dielectric layer, the recording layer being sandwiched between the protective layer and the second dielectric layer, the composition of the second dielectric layer remaining the same or varying in the direction of the film thickness of the second dielectric layer.

27. The optical information recording medium according to claim 26, wherein the thickness of the second dielectric layer is up to 30 nm.

28. The optical information recording medium according to claim 22, the recording layer comprises Ge, Sb and Te.

29. The optical information recording medium according to claim 22, wherein a second dielectric layer is present between the recording layer and the substrate, the protective layer being opposite the substrate with respect to the recording layer.

30. The optical information recording medium according to claim 29, wherein the first dielectric layer has a thickness of at least 30 nm.

31. The optical information recording medium according to claim 22, wherein the amount of the component having an oxidizing effect increases with increasing distance from the recording layer.

32. The optical information recording medium according to claim 22, further comprising a move inhibiting layer between the first protective layer and the recording layer.

33. The optical information recording medium according to claim 32, wherein the move inhibiting layer comprises a nitride-oxide of Ge, Si or a component element of the recording layer.

* * * * *